United States Patent [19]

Swenson et al.

[11] 4,135,352

[45] Jan. 23, 1979

[54] SEMICONTINUOUS LARGE ROUND BALING MACHINE

[75] Inventors: Edward L. Swenson; Thomas W. Ankenman, both of Hesston, Kans.

[73] Assignee: Hesston Corporation, Hesston, Kans.

[21] Appl. No.: 748,315

[22] Filed: Dec. 7, 1976

[51] Int. Cl.² ............................................ A01D 39/00
[52] U.S. Cl. .................................... 56/341; 100/88
[58] Field of Search ................... 56/1, 341, 342, 343, 56/DIG. 2; 100/88, 89, 76

[56] References Cited

U.S. PATENT DOCUMENTS

| 3,722,197 | 3/1973 | Vermeer | 56/341 |
|---|---|---|---|
| 3,914,922 | 10/1975 | Todd et al. | 56/1 |
| 3,914,926 | 10/1975 | Braunberger et al. | 56/341 |

*Primary Examiner*—Russell R. Kinsey

*Attorney, Agent, or Firm*—Schmidt, Johnson, Hovey & Williams

[57] ABSTRACT

Semicontinuous formation of round bales is permitted by positively capturing material introduced into the bale-forming chamber of a round baler after ejection of the last-formed bale and while the web normally defining the chamber remains displaced from its forming position. In one embodiment, the crop-capturing function is performed by a grid comprising a plurality of parallel, upwardly arcuate, elongate bars forwardly mounted on the baler for swinging movement about a transverse axis toward and away from the lower apron of the chamber. Another embodiment employs a rearwardly mounted, vertically swingable grid of parallel, substantially rectilinear, elongate bars to positively retain crop material in the chamber.

12 Claims, 7 Drawing Figures

SEMICONTINUOUS LARGE ROUND BALING MACHINE

This invention generally relates to round bale-forming machines of the type adapted to pick up ground-lying, windrowed crop and roll the latter into a large, cylindrical bale of compacted material having desired weather-shedding characteristics. More particularly, this invention concerns a method and apparatus for permitting the formation of such large round bales on a semicontinuous basis whereby the operator need not back up his baling machine at any point during the bale-forming operation, and yet, substantially all of the windrowed crop material is gathered by the machine.

Machines for forming giant cylindrical or round bales are well-known in the art; a typical construction for such a machine being shown, for example, in U.S. Pat. No. 3,722,197, issued to Gary Vermeer, on Mar. 26, 1973, and entitled "Method And Machine For Forming A Round Bale Of A Fibrous Material". Such machines are operable to raise a swath of crop material while advancing across a field and roll the gathered material within a generally cylindrical, expansible bale-forming chamber to form a diametrically growing round bale. Bales formed by such machines may approach 6 feet in diameter and weight as much as 1500 pounds, depending upon the type of material being baled, as well as the prevailing moisture conditions.

One significant problem with the giant round bale-forming machines has been experienced during the bale-unloading cycle. In this connection, virtually all machines known to the applicants employ some type of rearwardly shiftable gate structure for unloading of the bale from the bale-forming chamber, and the machine in many cases must be advanced to permit the raised and rearwardly shifted gate structure to clear the unloaded bale before the gate can be returned to its normal forming position. Hence, the operator must either discontinue feeding material to the forming chamber while the machine is advanced to clear the unloaded bale, or risk loss of the material projected into the chamber while the gate structure is in its open position. If the operator elects the former alternative, he must subserviently back up the machine to load material which he has passed over during discontinued operation of the pickup. On the other hand, if the operator elects the latter alternative he is faced with a lower yield from his fields since a significant portion of the material may be lost while the chamber remains open.

One approach to overcoming the aforementioned problem is disclosed in U.S. Pat. No. 3,914,922, issued to Todd, et al. on Oct. 28, 1975, and entitled "Method And Apparatus For Controlling The Movement Of Crop Material In A Roll Forming Machine". The device disclosed in this patent employs a rearwardly positioned, upturned, spring-type deflector which is intended to deflect loaded material upwardly when the gate structure is shifted to its unloading position. While the deflector structure in the mentioned patent does serve to redirect material which is projected into the bale-forming chamber, there is nothing to positively retain the material within the chamber while the gate structure remains open.

Accordingly, it is an important object of the present invention to provide a semicontinuous mode of forming giant round bales wherein the crop material is positively retained within the bale-forming chamber at all times during the bale-forming operation.

As a corollary to the above object, it is another important object of our invention to provide a swingable gride operable to temporarily enclose the bale-forming chamber while the web normally defining the chamber is shifted to an opened bale-ejecting position.

It is another object of the present invention to provide a machine as above, wherein the grid is biased toward an enclosing position for positively capturing material projected into the chamber while the web remains in its unloading position.

Figure 1:
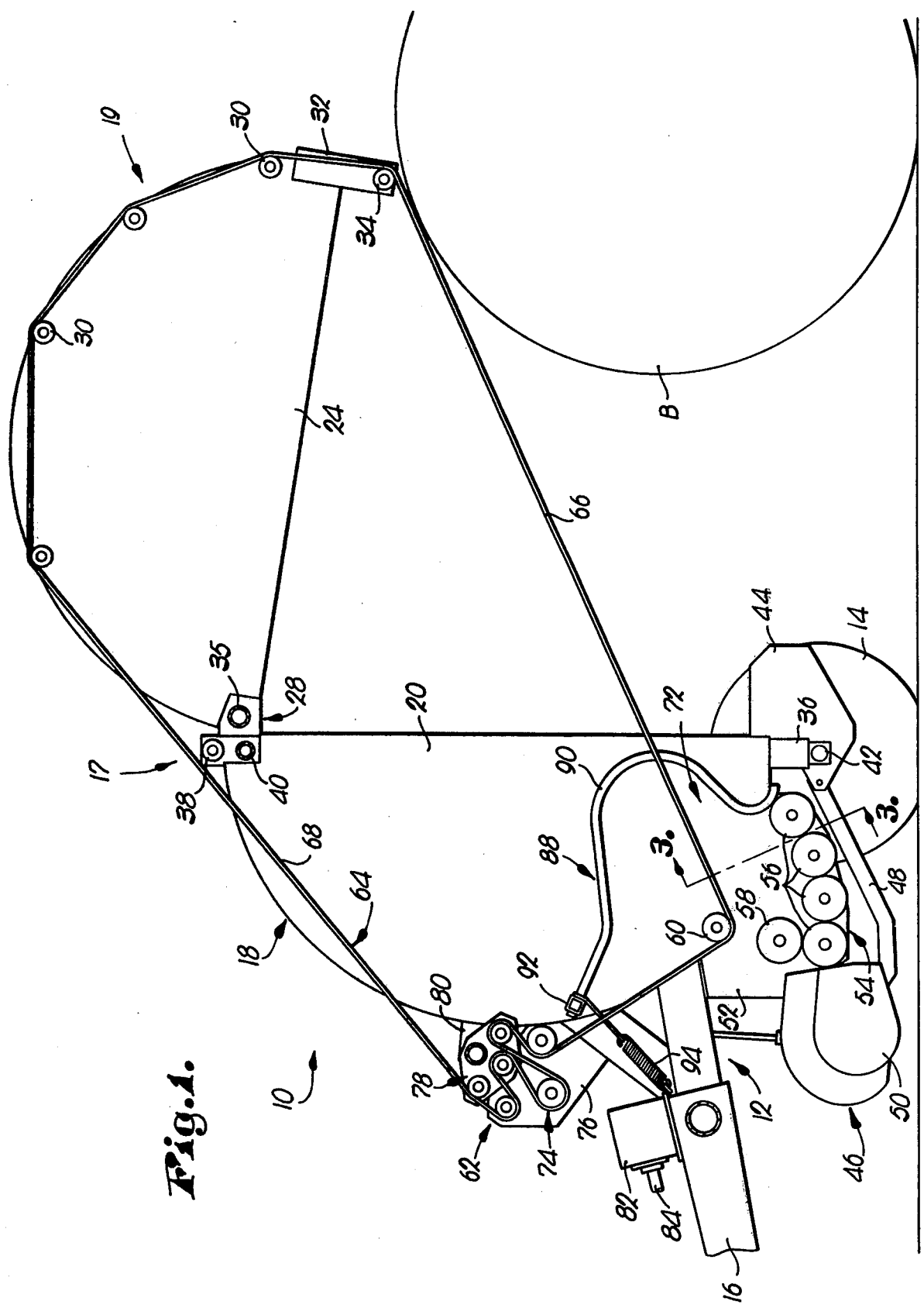
FIG. 1 is a fragmentary, longitudinal, cross-sectional view of a bale-forming machine constructed in accordance with the principles of the present invention shown in its unloading, baleejecting ejecting position.
Figure 2:
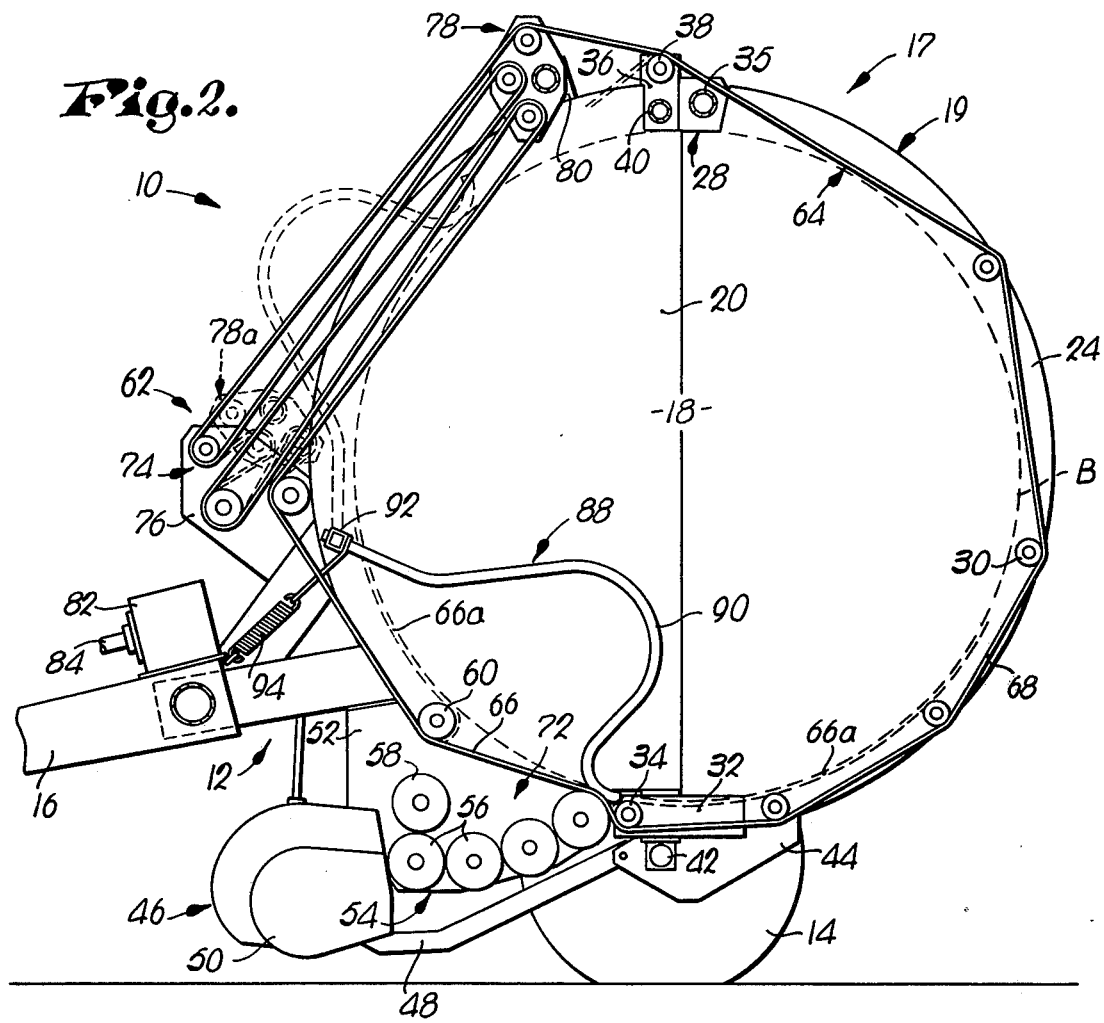
FIG. 2 is a fragmentary, longitudinal, cross-sectional view of the machine shown in its bale-forming position.

In FIGS. 1 and 2, a bale-forming machine 10 is shown which includes a frame 12 supported by laterally spaced, groundengaging wheels 14 (only one of which is shown) for advancement through a field of crop or the like. To this end, the frame 12 is provided with a forwardly extending tongue 16 (only partially shown in the drawings) of conventional construction adapted for coupling with a draft vehicle such as a farm tractor whereby the machine 10 may be toward therebehind.

The frame 12 carries a substantially cylindrical, transversely extending web support 17 having a rearwardly swingable gate 19 and including a pair of upright, laterally spaced, generally circular sidewalls 18 (only one of which is shown). Each sidewall 18 is segmented, having forward and rear, semicircular sections 20 and 24 respectively, the forward section 20 of each sidewall 18 being rigidly secured to frame 12 while the rear section 24 is pivotally secured to the section 20 by a mounting assembly 28.

The swingable rear sections 24 form a part of the gate 19 which further includes a plurality of rotatably mounted, transversely extending rolls 30 spanning the lateral spacing between the sections 24 and arranged around the arcuate periphery thereof. Each section 24 is provided with a lowermost, forwardly extending bracket 32 for rotatably supporting a roll 34 which is disposed parallel to the rolls 30 and also spans the distance between sections 24. Additionally, a torque tube 35 extends between the uppermost portions of sections 24 to assure in-unison swinging movement of the latter.

The frame 12 includes a pair of upstanding, elongate beams 36 extending along the linear periphery of respective front sections 20 and supporting at the uppermost end thereof a roll 38 arranged in a manner similar to the rolls 30 and 34 to extend transversely between the beams 36. The beams 36 are held in their laterally spaced position by an uppermost, transversely extending cross member 40, and a lowermost, rectangular, cross tube 42 rigidly secured between respective upper and lower ends of the beams 36. Additionally, the lower portion of each beam 36 supports a mounting plate 44 inwardly of the associated groundengaging wheel 14.

A tine-type pickup assembly 46 is floatingly secured to plates 44 by a pair of arms 48. The pickup assembly 46 is of conventional construction, and accordingly, the details thereof are not disclosed in the drawings, there being shown only the surrounding housing 50.

A lower apron 54 is supported immediately behind the pickup assembly 46 by a pair of spaced mounting panels 52 which depend from respective forward sections 20. The apron 54 comprises a series of four transversely extending, circumferentially contiguous cylinders 56 journaled on the panels 52 to present, in sum, a generally upwardly facing, movable surface. As shown in FIG. 1, the cylinders 56 are arranged in such a manner that the two forward cylinders 56 are disposed with their axes in a common horizontal plane whereas the two rearward cylinders 56 are disposed with their axes in a common plane skewed rearwardly and upwardly. The forwardmost cylinder 56 cooperates with a similar overlying cylinder 58 to partially compact the stream of crop material projected by the pickup assembly 46.

In addition to previously described structure, the web support 17 includes a transversely extending cylinder 60 rotatably supported adjacent the cylinder 58 by the forward section 20. Further, the support 17 has a belt-tensioning assembly 62 positioned adjacent the forward circular periphery of sections 20 between the rolls 38 and 60.

Figure 3:
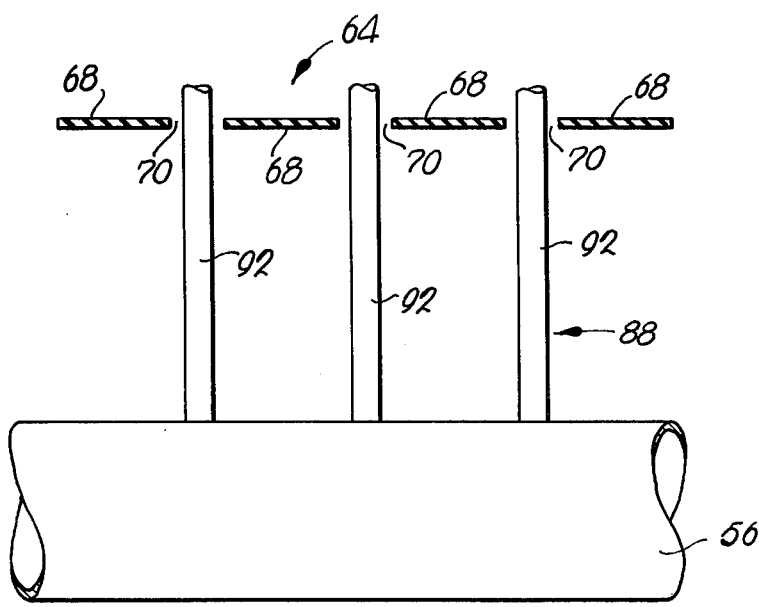
FIG. 3 is an enlarged, fragmentary, cross-sectional view taken along line 3—3 of FIG. 1.

A flexible web 64 is carried by the support 17 between the sidewalls 18 in overlying relationship to the apron 54 and includes an expanse 66 extending from roll 60 to the roll 34. The web 64 is formed by a plurality of flat, endless belts 68 trained around the rolls 30, 34, 38 and 60 and threaded through the belttensioning assembly 62. As shown in FIG. 3, the belts 68 are laterally offset from one another to define a plurality of spaces 70 between adjacent belts 68. As shown in FIG. 2, the expanse 66 of the flexible web 64 cooperates with the surface presented by the apron 54 to define a bale-forming chamber 72 wherein crop material presented to apron 54 by the pickup 46 is rolled into a diametrically increasing cylindrical bale in a manner to be described.

The above-mentioned tensioning assembly 62 through which the flexible belts 68 are threaded, comprises a stationary bank 74 of transversely extending rolls supported for rotation between a pair of mounting walls 76 on frame 12, and a movable bank 78 of rolls carried by a pair of laterally spaced arm assemblies 80 which are in turn pivotally secured to respective sides of frame 12 for swinging movement of the bank 78 toward and away from the stationary bank 74. The tensioning device 62 then, is of the type well-known in the art and it is to be understood that there is further provided means (not shown) for yieldably biasing the movable bank 78 away from the stationary bank 74 in a manner similar to the arrangement in conventional tensioning devices for bale-forming machines. As shown in FIG. 2, the web 64 is threaded through the bale-tensioning device 62 in such a manner that five linear stretches of the web 64 extend between the banks 74 and 78. Hence, when the bank 78 is moved toward a position in broken lines in FIG. 2 and solid lines in FIG. 1, the effective length of web 64 increases at a rate of approximately four-to-one relative to the distance traveled by bank 78.

A gearbox 82 is positioned on frame 12 adjacent tongue 16 and has a forwardly projecting drive shaft 84 (only partially shown in the drawings) which is adapted for coupling with the power takeoff of the towing vehicle. In this manner the gearbox 82 serves as the power source for all driven components of the machine 10. Though not shown in the drawings, it is to be understood that there is a power coupling between the gearbox 82 and the pickup assembly 46 such that the latter is driven in a direction to sweep crop upwardly from the ground and project the crop rearwardly to apron 54. Additionally, it is to be understood that there is a drive connection between the gearbox 82 and the cylinders 56 of apron 54 so that these members are rotated in a clockwise direction when viewed in FIGS. 1 or 2; a similar drive couples gearbox 82 with cylinder 58 to drive the latter in a counterclockwise direction. Finally, there is a power coupling between gearbox 82 and the stationary bank 74 such that the web assembly 64 is driven in a clockwise direction around circular sidewalls 18 when viewing the belt 64 as in FIGS. 1 and 2.

Turning now to the baling chamber 72 as shown in FIG. 2, it will be appreciated that countermoving surfaces are presented by apron 54 and the expanse 66 of web 64 such that material presented to chamber 72 will readily be caused to rotate in a counterclockwise direction, thereby forming a cylindrical mass which increases in diameter as more material is introduced into the chamber 72. It is important to note here that the chamber 72 is rendered expansible by virtue of a cooperative relationship between the tensioning assembly 62 and the expanse 66 of the web 64. In this regard, as the cylindrical bale in chamber 72 grows in diameter, it exerts an upwardly directed force on the expanse 66. When this force becomes great enough to overcome the biasing force on bank 78, the latter is caused to approach the stationary bank 74 whereupon expanse 66 is permitted to yield upwardly since, as previously explained, the effective length of the web 64 is increased at a rate of 5 to 1 as the bank 78 approaches bank 74.

Figure 4:
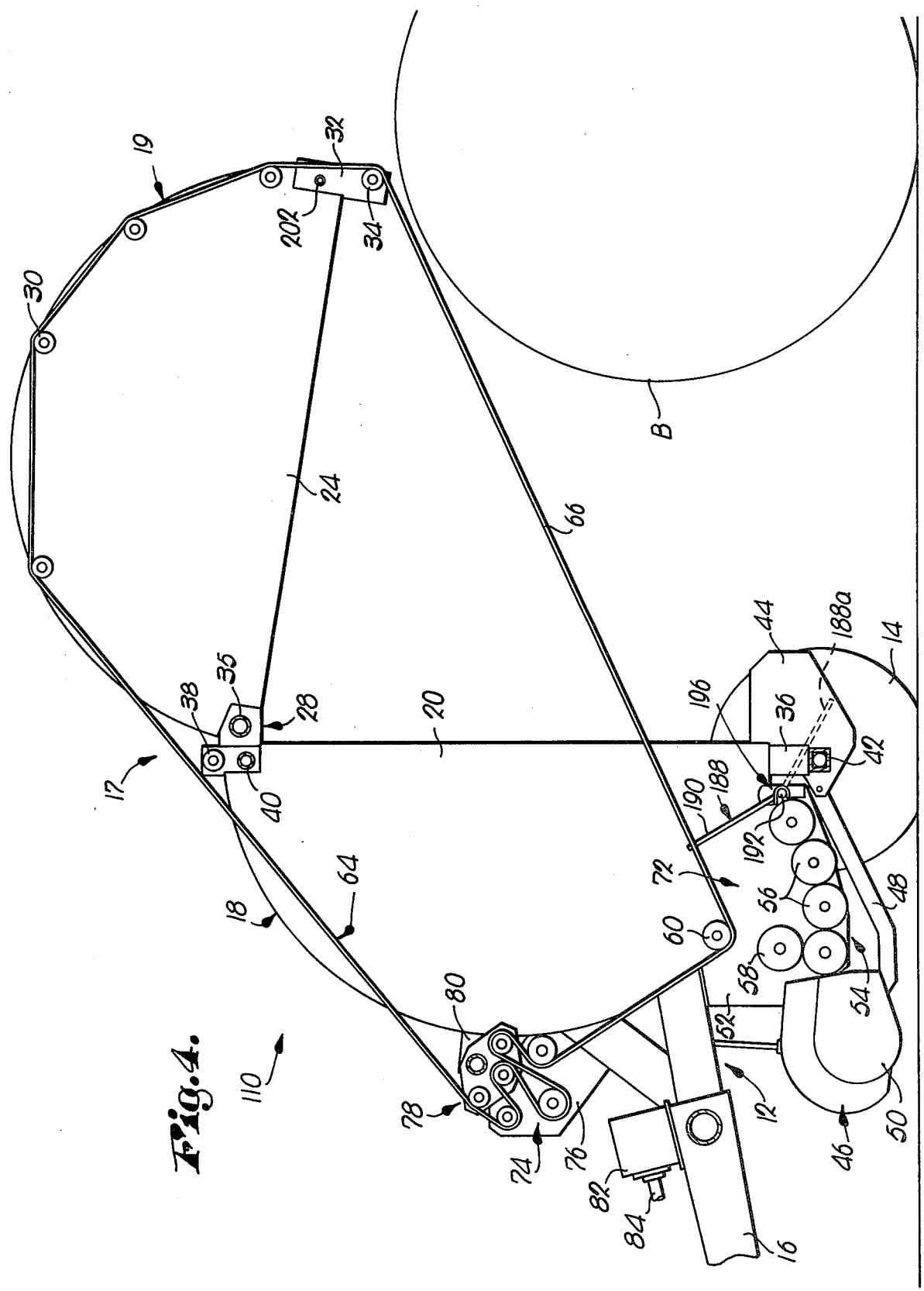
FIG. 4 is a fragmentary, longitudinal, cross-sectional view of a second embodiment of the present invention shown in its unloading, bale-ejecting position.

As the bale in chamber 72 continues to grow, the length of expanse 66 continuously increases while at all times remaining in engagement with the growing bale until finally, the expanse 66 assumes a large, upwardly arcuate configuration as shown in broken lines in FIG. 2 and designated 66a. At this point, the expansible baling chamber 72 has grown to its maximum size and the bale (designated B in FIGS. 1, 2 and 4) formed therewithin must be ejected from the machine before additional material can be baled. Note also that since the bale B has become substantially surrounded by expanse 66, the surface presented by apron 54 is only in minimal contact with the bale in the chamber 72.

Ejection of the bale B from chamber 72 is accomplished by pivoting the gate 19 through power means not shown about mounting 28 from the bale-forming position shown in FIG. 2 to an open, bale-ejecting position shown in FIG. 1. Since the gate 19 is supported by mounting 28 at the uppermost portion of the forward periphery, the gate 19 swings rearwardly and upwardly to its open position and the bale is ejected below the gate 19. In viewing FIG. 1 it will be seen that when the gate 19 is pivoted to the open position, expanse 66 is shifted away from the surface presented by apron 54 and consequently, the closure of the bale-forming chamber 72 is destroyed since there is a large, rearwardly positioned gap in the chamber 72. Again, as shown in FIG. 1, it will be seen that the gate 19 must remain in the open position until the machine 10 is advanced a distance sufficient to permit the gate 19 to clear the ejected bale B as the gate 19 is swung to its bale-forming position.

In order to reestablish closure of the bale-forming chamber 72 after the last formed bale has been ejected, and while the gate 19 must remain in the open position, there is provided structure in the form of a grid 88 extending between the sections 20 and pivotally secured thereto for swinging movement about a transversely extending axis. The grid 88 comprises a plurality of elongate, parallel, laterally spaced, upwardly arcuate bars 90 rigidly secured at their forwardmost ends to a transversely extending rod 92 which is concentric with the axis of swinging movement of the grid 88. As shown in FIG. 3, the bars 90 are supported by rod 92 in such a manner that they are aligned with the respective spaces 70 between belts 68 such that the grid 88 is permitted to swing through the web 64. In this manner, the grid 88 is free to operate through a full path of travel between a lowermost position wherein the rearmost ends of bars 90 are in contact with the rearmost cylinder 56, and an uppermost position wherein the bars 90 are substantially outboard of the belts 68 and adjacent the tensioning assembly 62 as shown in broken lines in FIG. 2 and designated 88a. A spring assembly 94 extends from the frame 12 to grid 88 for biasing the latter toward its lowermost position. It is important to note that, when the grid 88 is swung to its lowermost position, the bars 90 cooperate with apron 54 and a portion of expanse 66 to again close the chamber 72.

The initial operation of machine 10 is substantially the same as the operation of conventional round bale machines. The machine 10 is first coupled for towing behind a farm tractor with the drive shaft 84 connected to the tractor power takeoff and the machine is towed to a field where there is crop to be baled.

The machine 10 is advanced along a windrow in such a manner that the pickup assembly 46 engages the ground-lying crop material and projects the latter upwardly and rearwardly between the cylinder 58 and the forwardmost cylinder 56, whereupon the material is directed into baling chamber 72 in a steady, semicompacted stream. Countermoving surfaces presented by apron 54 and expanse 66 cause the stream of material to roll into a cylindrical bale of material. As material continues to be fed into the chamber 72, expanse 66 lengthens and yields upwardly in a manner hereinabove described so that the chamber 72 expands in response to the diametrical growth of the cylindrical bale.

When the bale B reaches the maximum dimensions as shown for example, in broken lines in FIG. 2, the gate 19 is swung rearwardly to provide an exit for ejection of the fully formed bale B. Of course, machine 10 may be provided with conventional tying means for the purpose of "tying off" the bale B prior to ejection. After the bale B has been ejected to the ground, the grid 88 is permitted to move from its uppermost position designated 88a in FIG. 2 to its lowermost position as shown in solid lines in FIGS. 1 and 2. Thus, the machine at this point corresponds to the representation of FIG. 1 wherein it is shown that the machine 10 must be moved forwardly to enable the gate 19 to clear the ejected bale B before the gate 19 can be returned to its closed, bale-forming position.

Forward movement of the machine 10 to provide the necessary clearance for closing gate 19 becomes a simple matter due to the presence of grid 88. In this connection, the grid 88 is, at this point, positioned to reestablish closure of the chamber 72 such that crop material introduced thereto by the pickup 46 is captively held within the chamber 72 for inclusion in the next bale. Hence, the operator simply resumes forward advancement of the machine 10 once the bale B has been ejected from the chamber 72 since all material picked up by the machine 10 while the gate 19 is returning to its closed position, will be retained within the chamber 72.

Though not mentioned previously, it will be understood that once the bale being formed in chamber 72 reaches a size which interferes with the grid 88 in its lowermost position, the latter is simply swung upwardly in response to further diametrical growth of the bale. Of course, this sequence will not occur until well after the gate 19 has had an opportunity to return to its closed, bale-forming position.

The second embodiment of the present invention is shown in FIGS. 4–7 wherein is disclosed a bale-forming machine 110 of substantially the same construction as the machine 10 with noted exceptions to be described hereinbelow.

A grid 188 is pivotally mounted between the sidewall 18 by a transversely extending sleeve 196 for fore-and-aft swinging movement. The grid 188 comprises a plurality of elongate, rectilinear, parallel, laterally spaced bars 190 rigidly secured at their rearmost ends to a transversely extending tubular rod 192 which is concentric within sleeve 196 and journaled at opposite ends by respective sections 20.

Sleeve 196 has a plurality of cutouts 198 corresponding to the positions of bars 190 along rod 192 such that the bars 190 project through the cutouts 198 and the grid 188 is free to rotate relative to the sleeve 196. Additionally, the sleeve 196 is provided with mounting brackets 200 at opposite ends thereof for rigid attachment to respective sections 20 of the sidewalls 18.

Figure 5:
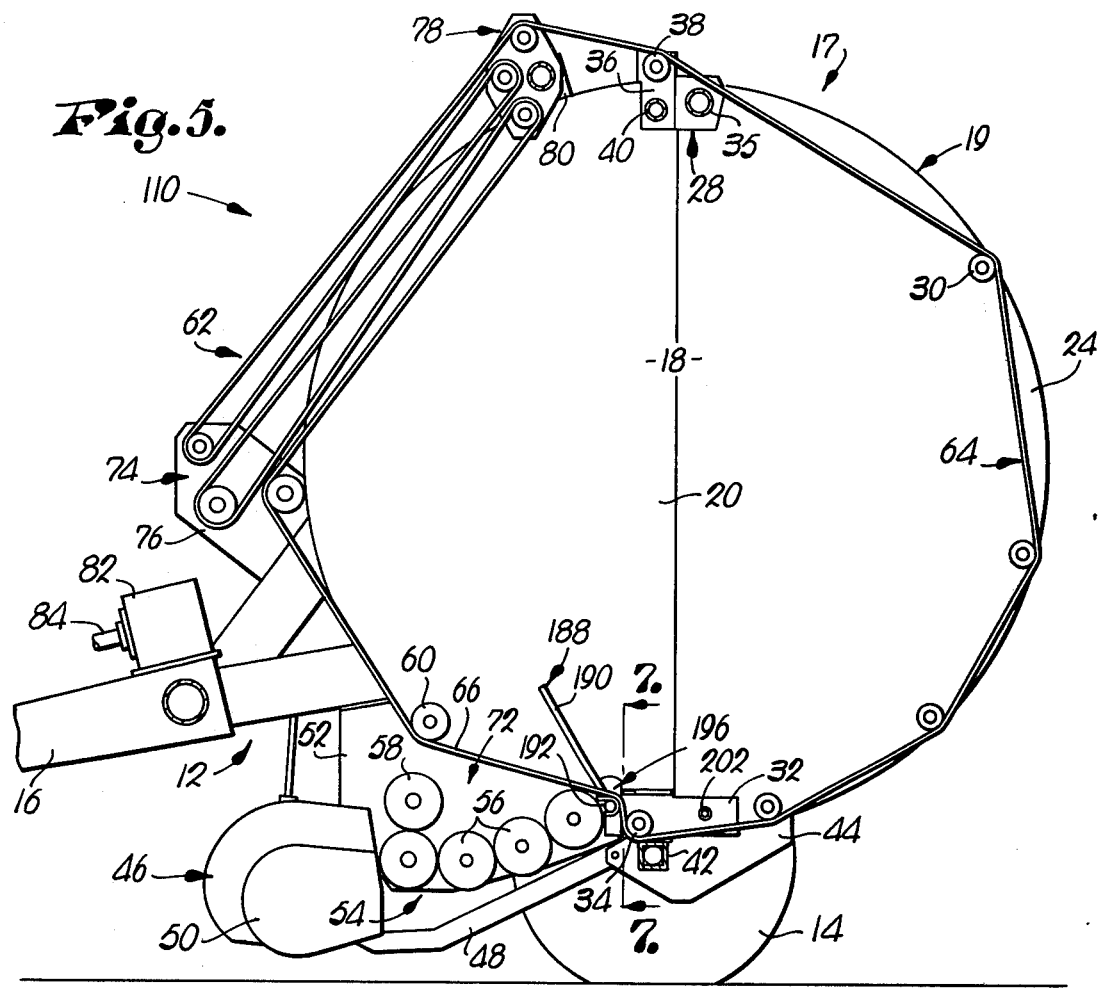
FIG. 5 is a fragmentary, longitudinal, cross-sectional view of the machine shown in FIG. 4 and illustrating the baleforming position of the machine.
Figure 6:
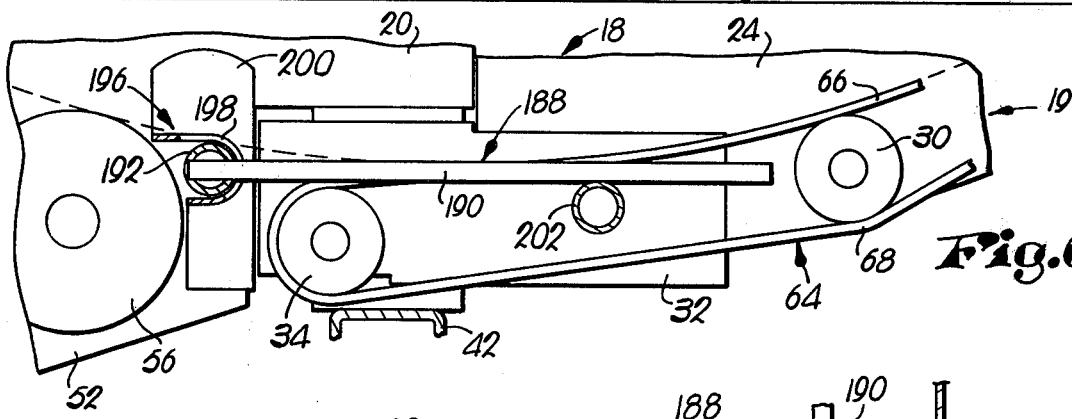
FIG. 6 is an enlarged, fragmentary, longitudinal crossectional view of the machine shown in FIG. 4 and illustrating the shiftable grid in its retracted position.

The arrangement of sleeve 196 is such that the bars 190 of grid 188 extend in a fore-and-aft direction and are aligned with the spaces 70 between adjacent belts 68 whereby the grid 188 may be swung through the web 64. Thus, the grid 188 is permitted to swing between the forwardmost position as is shown in FIG. 5, wherein the bars 190 are in contact with the forward terminus of cutouts 198 and a rear position shown in FIG. 6 wherein the bars 190 are nested within the spaces 70 between belts 68. Stop means in the form of a transversely extending tubular bar 202 supported by brackets 32 limits the rearward swinging of the grid 188, as shown in FIG. 6. When gate 19 is shifted to the open position, the bar 202 no longer operates as a stop means for the grid 188 and the latter may swing beyond its normal rear position to contact cross tube 44 as shown in broken lines in FIG. 4 and designated 188a.

Figure 7:
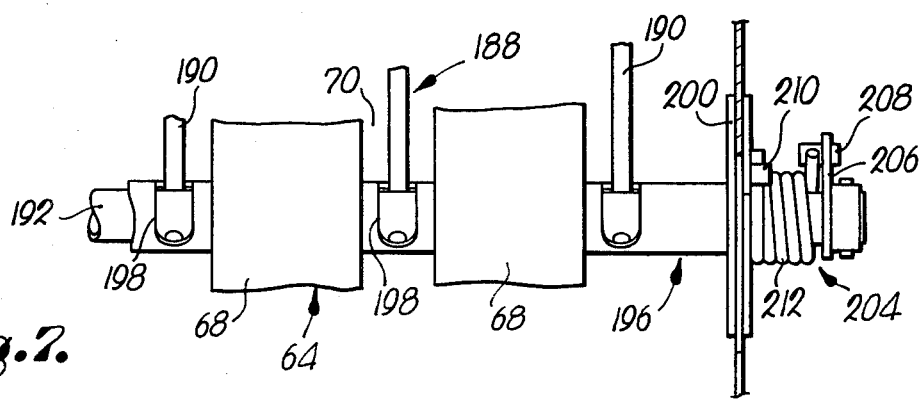
FIG. 7 is an enlarged, fragmentary, cross-sectional view taken along line 7—7 of FIG. 5.

The grid 188 is yieldably biased toward its forwardmost position by a pair of spring assemblies 204 (only one of which is shown in FIG. 7) mounted on opposite ends of rod 192, which ends project outwardly beyond the respective sidewalls 18. Each spring assembly 204 includes a crank 206 rigidly secured to rod 192 and having a stop pin 208 on the outermost end of the crank 206. A complemental stop pin 210 is rigidly secured to the section 20 of a sidewall 18 and a torsion spring 212 is captively disposed on the rod 192 having its opposite ends in engagement with respective stops 208 and 210.

In this manner the torsion spring operates on crank 206 to yieldably resist clockwise swinging of the grid 188 as viewed in FIG. 5, and yieldably biases the grid 188 toward its forwardmost position wherein the grid overlies apron 54.

Referring now to FIG. 5, it is apparent that the grid 188 cooperates with apron 54 and a portion of the expanse 66 to reestablish closure of the bale-forming chamber 72 when gate 19 has been shifted to its open bale-rejecting position. Accordingly, it may be seen that the operation of the bale-forming machine 110 is exactly the same as the operation of machine 10 with the exception that the grid 188 swings forwardly to reestablish closure of the baling chamber 72 in contrast to the rearward swinging of grid 88 to close the chamber 72.

From the foregoing, it is apparent that the present invention accomplishes each of the objects set forth hereinabove in a simple and inexpensive manner. The swinging grid 88 (188) operates to effectively and positively capture all material presented to the baling chamber 72 during the time period that gate 19 is shifted away from its bale-forming position. Hence, the machine operator is no longer burdened with the cumbersome forwardreverse-forward manipulation of the baling machine after unloading as explained hereinabove. Accordingly, the present invention offers significant savings to the farmer in terms of time, crop yield, and operating expense.

Moreover, the above described benefits are accomplished without the use of complex mechanism or powered device such that the farmer is presented with a means for semicontinuous round bale-forming without the need for developing a specialized operating technique. The grid 88 (188) and the biasing structure therefor is so simple in construction and operation that it is virtually maintenance-free and, of course, requires no special operator skill for satisfactory performance since there is provided essentially automatic operation.

We claim:

1. In a machine for forming round bales of crop material:
   means presenting movable, upwardly facing surface;
   a pickup adapted for directing crop material to said surface;
   a flexible web supported over said surface and cooperating therewith to define an enclosed, substantially cylindrical, radially expansible bale-forming chamber for rolling said crop material into a diametrically increasing round bale,
   said web having a shiftable portion for opening said chamber to permit ejection of said bale from the chamber when the bale is fully formed; and
   structure cooperable with said surface and said web to reestablish the closure of said chamber after said bale is ejected and while said portion remains in the open position such that crop material subsequently delivered to said surface is retained in said chamber for inclusion in the next bale.

2. In a machine as claimed in claim 1, wherein said structure includes a grid pivotally mounted at one end for vertical swinging movement of the grid toward and away from said surface.

3. In a machine as claimed in claim 2, wherein said grid is yieldably biased toward said surface.

4. In a machine as claimed in claim 3, wherein said one end is positioned forwardly above said surface such that said grid moves away from the surface when the grid is swung upwardly and forwardly.

5. In a machine as claimed in claim 3, wherein said grid is upwardly arcuate.

6. In a machine as claimed in claim 3, wherein said one end is positioned rearwardly of said surface such that said grid moves away from said surface when the grid is swung upwardly and rearwardly.

7. In a machine as claimed in claim 6, wherein said structure includes a stop for limiting the swinging movement of said grid toward said surface.

8. In a machine as claimed in claim 3, wherein said grid is substantially planar.

9. In a machine as claimed in claim 1, wherein said flexible web comprises a plurality of laterally spaced, endless belts.

10. In a machine as claimed in claim 9, wherein said structure includes a grid mounted for vertical swinging movement toward and away from said surface, said grid comprising a plurality of parallel, laterally spaced, elongate bars aligned with the spaces between said belts whereby and grid may be swung through said web.

11. In a machine as claimed in claim 1, wherein said machine includes a support for said web, said support having a pair of laterally spaced, upstanding sidewalls, said structure substantially spanning the distance between said sidewalls.

12. In a machine as claimed in claim 11, wherein said structure includes a grid pivotally mounted on said sidewalls for vertical swinging movement about an axis extending transversely therebetween.

* * * * *